US012631435B1

(12) United States Patent
Foltz et al.

(10) Patent No.: US 12,631,435 B1
(45) Date of Patent: May 19, 2026

(54) UNMANNED APPARATUS FOR NEUTRALIZING EXPLOSIVE THREATS LOCATED ABOVE AND BELOW WATER

(71) Applicant: The United States of America as Represented by the Secretary of the Navy, Indian Head, MD (US)

(72) Inventors: Lee Foltz, Indian Head, MD (US); Mike Shattuck, Port Royal, VA (US); Bruce Strackbein, Arnold, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 421 days.

(21) Appl. No.: 18/445,652

(22) Filed: Dec. 13, 2023

(51) Int. Cl.
| | |
|---|---|
| *B64C 39/02* | (2023.01) |
| *B64D 1/04* | (2006.01) |
| *F41H 11/16* | (2011.01) |
| *F42D 1/22* | (2006.01) |
| *F42D 5/04* | (2006.01) |
| *B64U 101/00* | (2023.01) |
| *B64U 101/18* | (2023.01) |

(52) U.S. Cl.
CPC .............. *F42D 5/04* (2013.01); *B64C 39/024* (2013.01); *B64D 1/04* (2013.01); *F41H 11/16* (2013.01); *B64U 2101/00* (2023.01); *B64U 2101/18* (2023.01); *F42D 1/22* (2013.01)

(58) Field of Classification Search
CPC ... F42D 5/04; F42D 1/22; F41H 11/12; F41H 11/14; F41H 11/16; F41H 11/32; B64U 2101/00; B64U 2101/18; B64C 39/00; B64C 39/02; B64C 39/024; B64D 1/04; B64D 1/06

USPC ........................ 86/50; 102/402, 403; 89/1.13
See application file for complete search history.

(56) References Cited

U.S. PATENT DOCUMENTS

| | | | | |
|---|---|---|---|---|
| 5,437,230 | A | * | 8/1995 | Harris ...................... B63G 7/00 |
| | | | | 102/302 |
| 6,359,834 | B1 | | 3/2002 | English |
| 8,297,162 | B2 | * | 10/2012 | Fournier .................. B63G 7/02 |
| | | | | 89/1.13 |
| 9,329,001 | B2 | | 5/2016 | Mohammadi |
| 9,463,852 | B2 | | 10/2016 | Fairfield et al. |
| 2022/0074712 | A1 | * | 3/2022 | Oh ............................ F42D 5/04 |

(Continued)

FOREIGN PATENT DOCUMENTS

| | | | | | |
|---|---|---|---|---|---|
| KR | 20180053034 | A | * | 5/2018 | .............. F42B 10/56 |
| WO | WO2012051604 | | | 4/2012 | |

(Continued)

*Primary Examiner* — James S Bergin
(74) *Attorney, Agent, or Firm* — Fredric J. Zimmerman

(57) ABSTRACT

An explosive ordnance disposal (EOD) apparatus enables a human operator to deliver an EOD neutralization tool via an unmanned vehicle to a target attached to a ferrous or non-ferrous surface, position the tool to the target, fix the neutralization tool in place, and activate the neutralization tool, all remotely so that the human operator is not in danger. The unmanned vehicle disengages from the remainder of the EOD apparatus prior to neutralizing the target so that the unmanned vehicle is not damaged or destroyed. The EOD apparatus includes a flexible web interface that positions a tool holder ring containing the EOD neutralization tool onto the target before finally fixing the EOD neutralization tool into place against a ferrous or non-ferrous surface.

15 Claims, 6 Drawing Sheets

(56) References Cited

U.S. PATENT DOCUMENTS

2025/0012550 A1 *  1/2025  Porter ..................... F42B 25/00
2025/0058873 A1 *  2/2025  Tan .......................... B64D 1/06

FOREIGN PATENT DOCUMENTS

WO      WO-2012051604 A2 *  4/2012   ............... F42D 5/04
WO      WO2018010756 A       1/2018
WO      WO-2018010756 A1 *  1/2018   ............. F41H 11/13

* cited by examiner

100

200

CONVENTIONAL TECHNOLOGY

200

100

CONVENTIONAL TECHNOLOGY

UNMANNED APPARATUS FOR NEUTRALIZING EXPLOSIVE THREATS LOCATED ABOVE AND BELOW WATER

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The invention relates in general to Explosive Ordnance Disposal (EOD) and in particular to using an unmanned apparatus to neutralize explosive threats above water and below water where the explosive threats are located on ferrous or non-ferrous surfaces.

BACKGROUND OF THE INVENTION

As used throughout this disclosure, the word "target" is defined to mean "explosive threat."

FIGS. 1A and 1B are schematic side and elevation views of a conventional target 100 disposed on a ferrous surface 200. The target 100 may be above or below water. The target 100 shown in FIGS. 1A and 1B is exemplary only, other shapes and sizes of targets are possible.

Some conventional technologies require a human operator to position various EOD neutralization tools manually against targets 100 that are fixed to surfaces and, in an exemplary embodiment, ferrous or non-ferrous surfaces 200 above or below water. The operator is at a high risk of injury or death due to increased time proximate the target 100 and the unknown condition of the target 100. Other conventional technologies for underwater use only may employ an Unmanned Underwater Vehicle (UUV) that destroys the underwater target 100 as well as the UUV. The destruction of the UUV results in a large replacement cost each time a target 100 is neutralized. Other conventional technologies for above water use may rely on a laser carried by an unmanned air vehicle, but the laser may result in a high order detonation of the target 100 rather than neutralization of the target 100.

A need exists for an apparatus to neutralize a target 100 attached to a ferrous or non-ferrous surface 200 above or below the water using an unmanned vehicle (unmanned aerial vehicle (UAV), small unmanned aerial vehicle (sUAV), unmanned underwater vehicle (UUV), etc.). The apparatus will deliver the EOD neutralization tool to the target 100, position the EOD neutralization tool to the target, fix the EOD neutralization tool in place, and activate the EOD neutralization tool, all remotely without the human operator being in danger because of proximity to the target 100. In addition, neutralization of the target 100 must not destroy the unmanned delivery vehicle.

SUMMARY OF THE INVENTION

One aspect of the invention is an explosive ordnance disposal apparatus for placing a tool holder ring on a target attached to a ferrous surface. The apparatus may include a flexible web docking ring. The flexible web docking ring may include an octagonal base large enough to surround the tool holder ring and the target. A plurality of magnets may be attached to and spaced apart on one face of the octagonal base and configured to attach the octagonal base to the ferrous or non-ferrous surface surrounding the target. An elastic cord in the form of a 4 point star pattern may center the tool holder ring to the octagonal base. Four outer vertices of the 4 point star pattern elastic cord may be fixed to respective ones of four equally spaced-apart points on the octagonal base. Four inner vertices of the 4 point star pattern elastic cord may be slidably connected to the tool holder ring by passing the 4 point star pattern elastic cord through respective ones of four loops equally spaced around the tool holder ring.

The flexible web docking ring may include four angled members having first ends equally spaced-apart and fixed to the octagonal base, the four members extending upwardly away from the octagonal base at an angle of about 45 degrees and ending in second ends that are joined together at a central longitudinal axis of the octagonal base.

The tool holder ring may hold at least one explosive ordnance disposal neutralization tool. The at least one explosive ordnance disposal neutralization tool may include an explosive charge.

A second aspect of the invention is an explosive ordnance disposal apparatus for neutralizing a target attached to a ferrous or non-ferrous surface. The apparatus may include a tool holder ring for holding an explosive ordnance disposal neutralization tool. The tool holder ring may have a shape to conform to at least a portion of the target and may have four loops equally spaced around the tool holder ring. The apparatus may include a flexible web docking ring having an octagonal base large enough to surround the tool holder ring and the target. A plurality of magnets may be attached to and spaced apart on one face of the octagonal base and configured to attach the octagonal base to the ferrous or non-ferrous surface surrounding the target. An elastic cord in the form of a 4 point star pattern may center the tool holder ring to the octagonal base. Four outer vertices of the 4 point star pattern elastic cord may be fixed to respective ones of four equally spaced-apart points on the octagonal base. Four inner vertices of the 4 point star pattern elastic cord may be slidably connected to the tool holder ring by passing the 4 point star pattern elastic cord through respective ones of the four loops equally spaced around the tool holder ring. Four angled members may have first ends equally spaced-apart and fixed to the octagonal base. The four angled members may extend upwardly away from the octagonal base at an angle of about 45 degrees and end in second ends that are joined together at a central longitudinal axis of the octagonal base. A longitudinal member may have a first end fixed to and extending perpendicular from one of eight sides of the octagonal base and a fireset fixed to a second end of the longitudinal member. The fireset may be connected to the explosive ordnance disposal neutralization tool via an initiating signal transmitter. A stabilizing member may have one end fixed to the longitudinal member and a second end fixed near the second end of one of the four equally-spaced apart angled members of the flexible docking ring. A cross arm may be fixed perpendicular to the longitudinal member at a point on the longitudinal member that is the center of gravity of the combined tool holder, flexible web docking ring, and longitudinal member. A second elastic cord may be fixed to a first end of the cross arm. The second elastic cord may extend to and be fixed to first and second fixation points located on the longitudinal member on opposite sides of the cross arm. The second elastic cord may extend from the first and second fixation points on the longitudinal member to a second end of the cross arm and be fixed to the second end of the cross arm such that the second elastic cord forms a four-sided polygonal shape.

A low-stretch line may be connected to the longitudinal member, the cross arm, and an unmanned vehicle to form a tensegrity structure. The low-stretch line may be fixed to the first and second ends of the cross arm and the first and second fixation points located on the longitudinal member to define four loops of the low-stretch line. Each loop of the low-stretch line may be looped over a pin in a drop kit of the unmanned vehicle so that the explosive ordnance disposal apparatus travels with the unmanned vehicle. When the pin is opened, the four loops of the low-stretch line are released from the unmanned vehicle thereby separating the explosive ordnance disposal apparatus from the unmanned vehicle.

The apparatus may include the unmanned vehicle. The unmanned vehicle may be an aerial vehicle or an underwater vehicle. The unmanned vehicle may include four downwardly depending legs with an eyelet disposed at a bottom portion of each downwardly depending leg. Each of the four loops of the low-stretch line that are looped over the pin may pass through a respective eyelet.

The invention will be better understood, and further objects, features, and advantages thereof will become more apparent from the following description of the exemplary embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE INVENTION

Exemplary embodiments of an EOD apparatus enable a human operator to deliver a neutralization tool via an unmanned vehicle (UAV, sUAV, UUV, etc.) to a target 100 attached to a ferrous or non-ferrous surface 200, position the tool to the target 100, fix the neutralization tool in place, and activate the neutralization tool, all remotely so that the human operator is not in danger. In addition, neutralization of the target 100 does not destroy the unmanned delivery vehicle. Part of the EOD apparatus is a flexible web interface that positions EOD neutralization tools onto a target 100 before finally fixing the EOD neutralization tools into place against a ferrous or non-ferrous surface 200. Generally, the type and size of the target 100 will be known before the EOD apparatus embarks on its journey to the threat. By knowing the type and size of the target 100 beforehand, the EOD apparatus may be modified to optimize neutralization of a particular target.

Figure 1A:
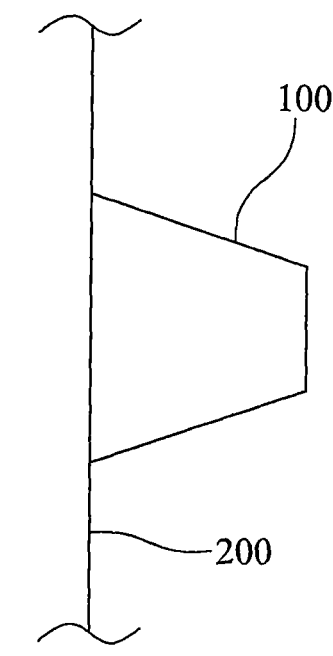
FIGS. 1A and 1B are schematic side and elevation views of a conventional target disposed on a ferrous surface.
Figure 1B:
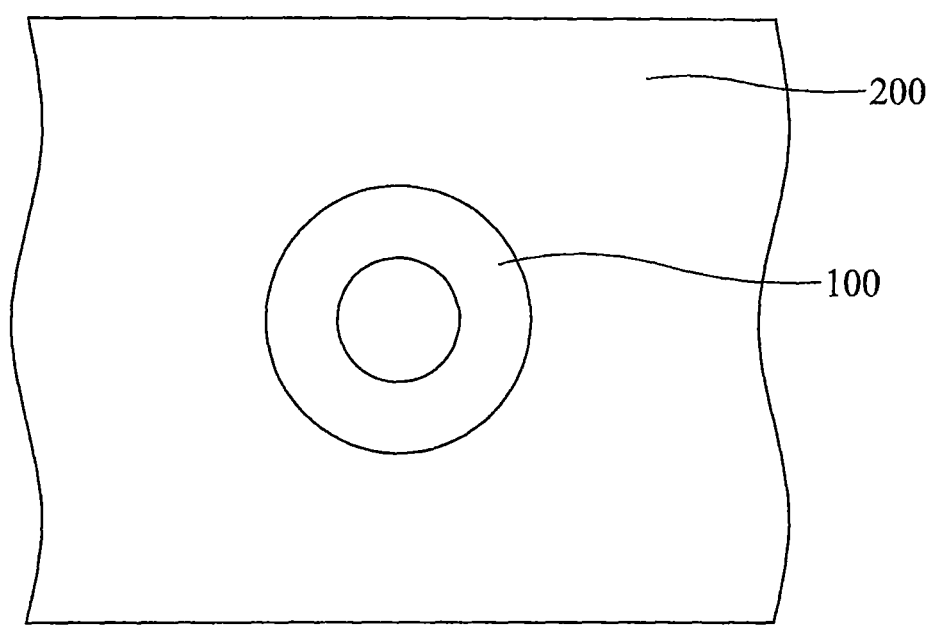
Figures 2A, 2B:
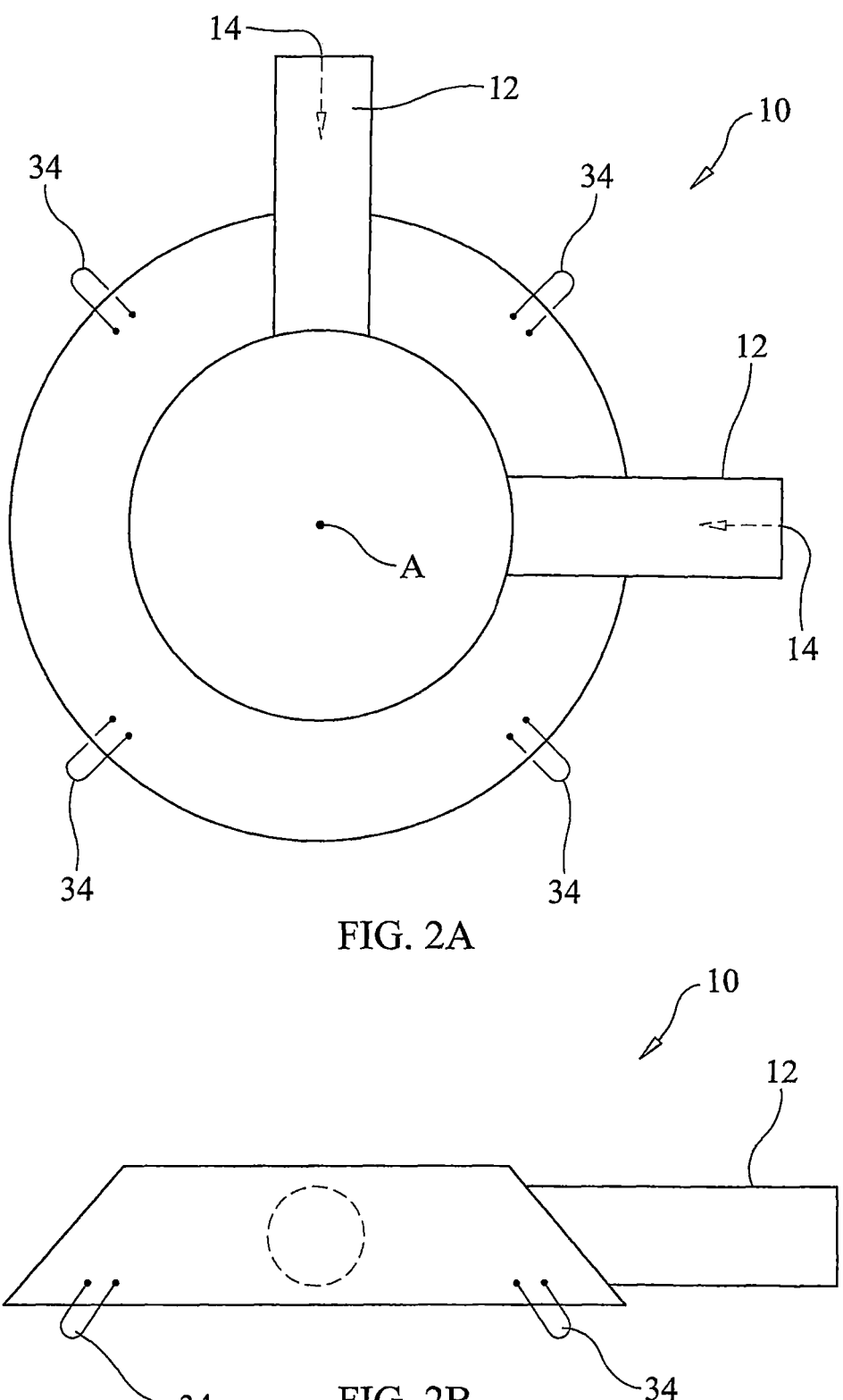
FIGS. 2A and 2B are schematic side and elevation views of an exemplary embodiment of a tool holder ring.

FIGS. 2A and 2B are schematic side and elevation views of an exemplary embodiment of a tool holder ring 10 for an EOD apparatus. The tool holder ring 10 holds one or more EOD neutralization tools 14. The EOD neutralization tools 14 may vary depending on the application. In some exemplary embodiments, the EOD neutralization tools 14 are placed in hollow tubes 12 fixed to the tool holder ring 10. In an exemplary embodiment, the EOD neutralization tools 14 may be explosive charges contained in respective hollow tubes 12 and directed to the target 100. The tool holder ring 10 may be made from, for example, a broad array of plastics or other low weight materials. The tool holder ring has a central longitudinal axis A. The tool holder ring 10 has a shape to conform or surround at least a portion of a target 100. An exemplary target 100 may be generally in the shape of a frustum of a cone. In an exemplary embodiment, the tool holder ring 10 has the shape of a frustum of a cone that conforms to a portion of a target 100 having the shape of a frustum of a cone. Tool holder ring 10 may include four closed loops 34 equally spaced around the tool holder ring 10. The four closed loops 34 may be made of a plastic or plastic-like material.

Figure 3A:
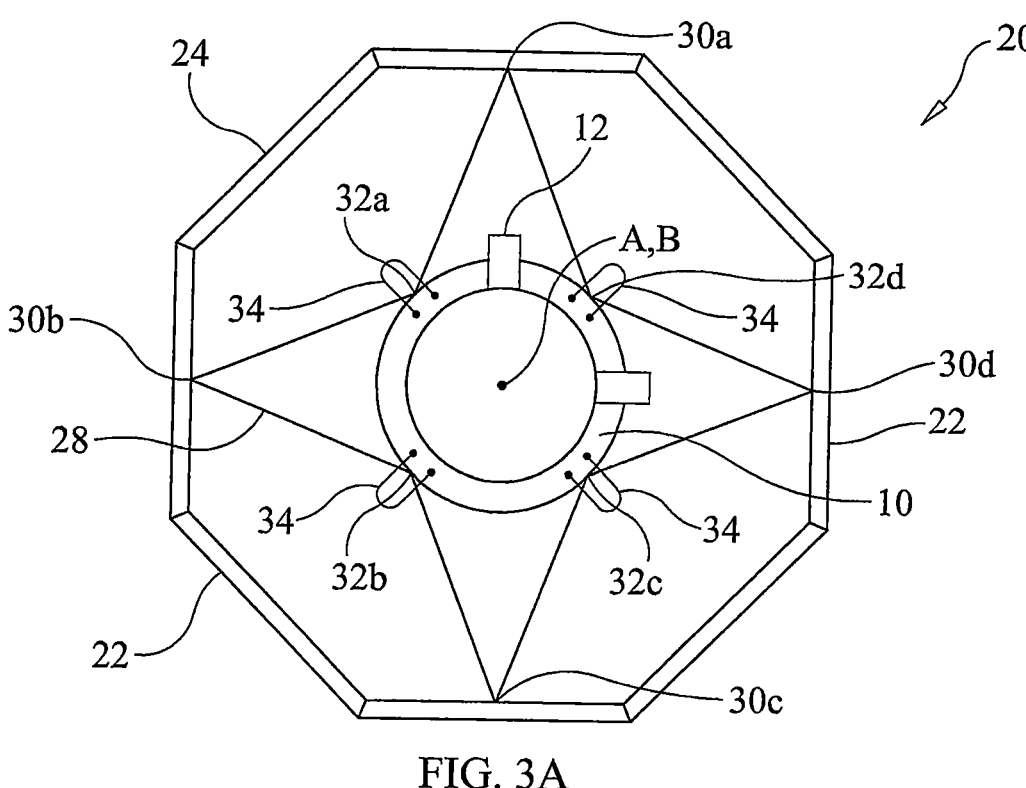
FIGS. 3A and 3B are front and rear elevation views of an exemplary embodiment of a flexible web docking ring.
Figure 3B:
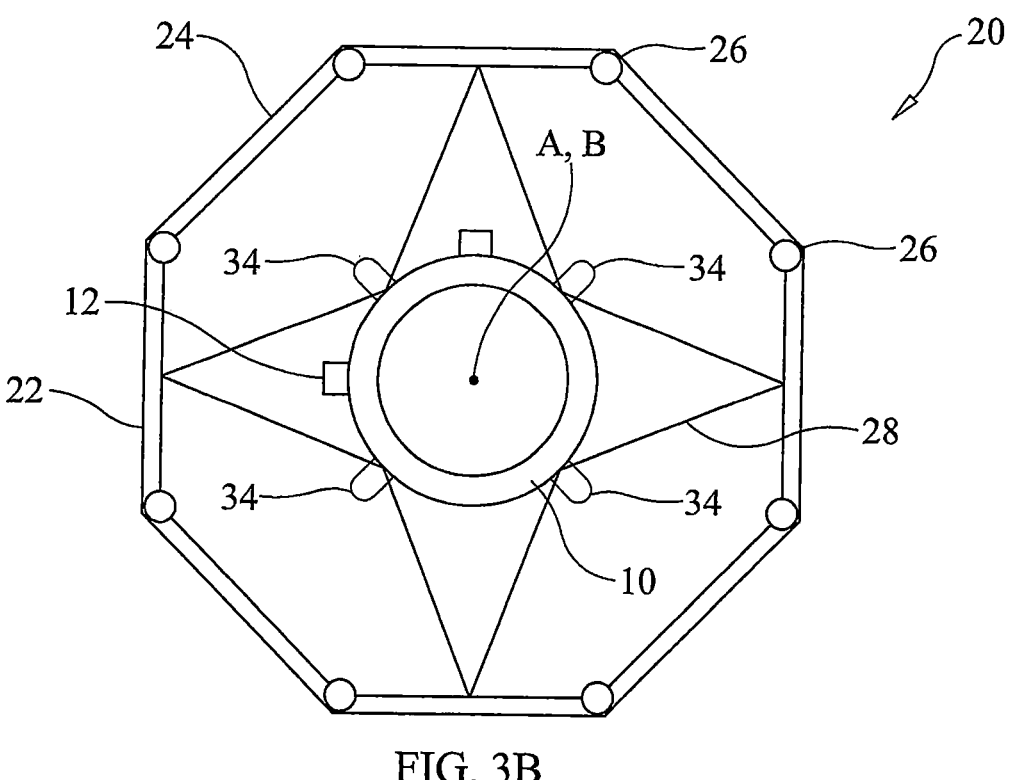

FIGS. 3A and 3B are front and rear elevation views of an exemplary embodiment of a flexible web docking ring 20. The flexible web docking ring 20: 1) aids in docking or conforming the tool holder ring 10 to the target 100; 2) attaches to the ferrous or non-ferrous surface 200 on which the target 100 is placed; and 3) provides a structure for connection to the remainder of the EOD apparatus. The flexible web docking ring 20 may include an octagonal base 22 with eight sides 24. The octagonal base 22 is large enough to encompass or surround, simultaneously, the tool holder ring 10 and encompass or surround the target 100. The octagonal base 22 has a central longitudinal axis B. In an exemplary embodiment, the sides 24 of the octagonal base 22 may be made of, for example, PVC tubing or other plastic tubing or solid members. In an exemplary embodiment, a plurality of magnets 26 are fixed to the octagonal base 22 and are spaced apart from each other on a rear face of the octagonal base. The plurality of magnets 26 secure the octagonal base 22 to the ferrous surface 200 around the target 100. In an exemplary embodiment, the structure may use sticky substances, powdered actuated nails, and other methods when attaching to a non-ferrous surface 200.

Attached to the octagonal base 22 and the tool holder ring 10 is a closed loop of elastic cord 28 in the form of a 4 point star pattern that centers the tool holder ring 10 to the octagonal base 22 such that the central longitudinal axes A, B of the octagonal base 22 and the tool holder ring 10 are coaxial. The four outer vertices 30a, 30b, 30c, 30d of the 4 point star pattern are fixed to four equally spaced-apart points on the octagonal base 22. The four inner vertices 32a, 32b, 32c 32d of the 4 point star pattern are connected to the tool holder ring 10 via the four equally spaced-apart loops 34 through which the elastic cord 28 is slidable. The elastic cord 28 that is slidable through the loops 34 provides some freedom of movement for the tool holder ring 10 as the tool holder ring is being docked or conformed to the target 100.

Figure 4A:
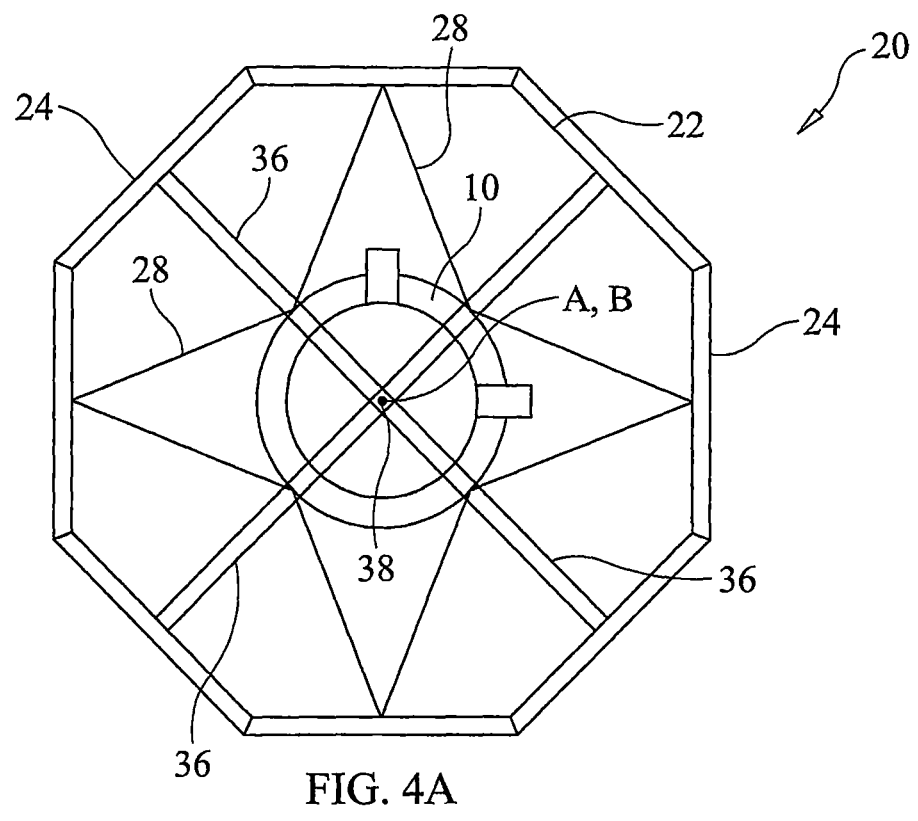
FIGS. 4A and 4B are front and side views of additional structure fixed to the flexible web docking ring of FIGS. 3A and 3B.
Figure 4B:
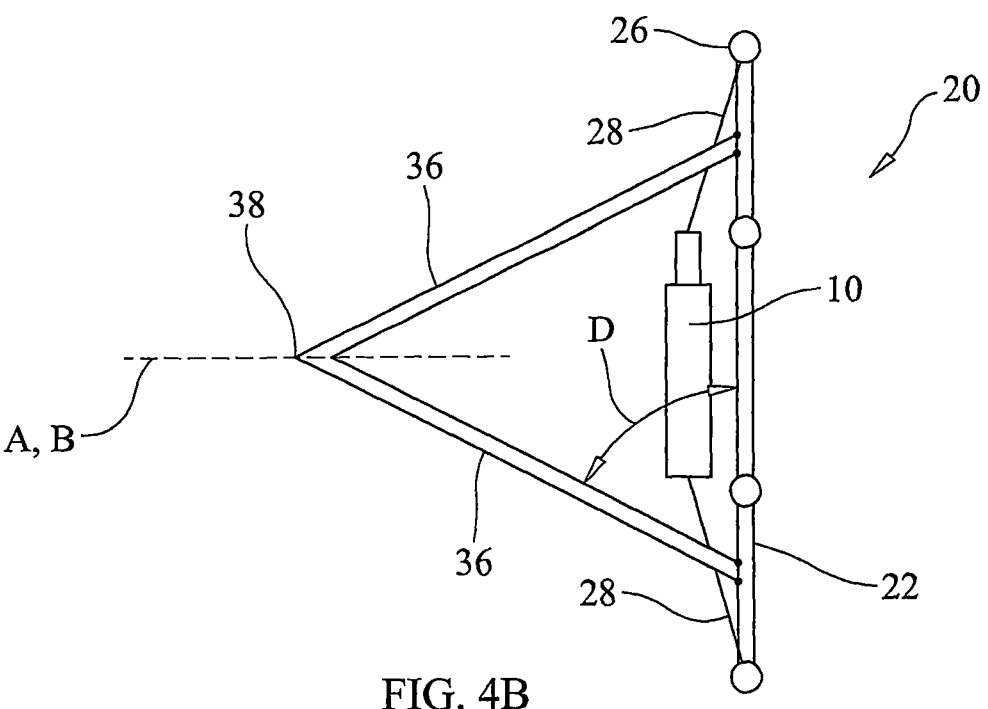

FIGS. 4A and 4B are front and side views of an embodiment of the flexible docking ring 20 with additional structure that may be attached to the flexible web docking ring. The flexible web docking ring 20 may include four equally spaced-apart angled members 36 that are fixed at one end to the octagonal base 22 and that extend upward at an angle D of about 45 degrees from the octagonal base and are joined together at a point 38 on the coaxial central longitudinal axes A, B of the tool holder ring 10 and the octagonal base.

Figure 5A:
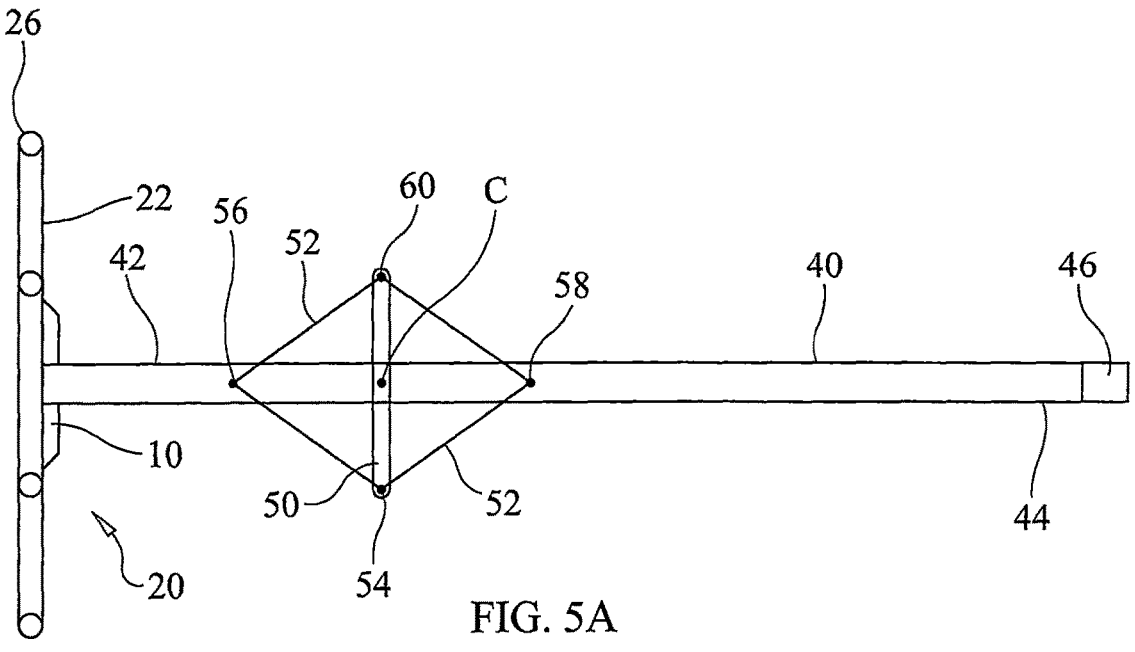
FIGS. 5A and 5B are top and elevation views, respectively, an exemplary embodiment of additional components of the EOD apparatus that are connected to the flexible web docking ring.
Figure 5B:
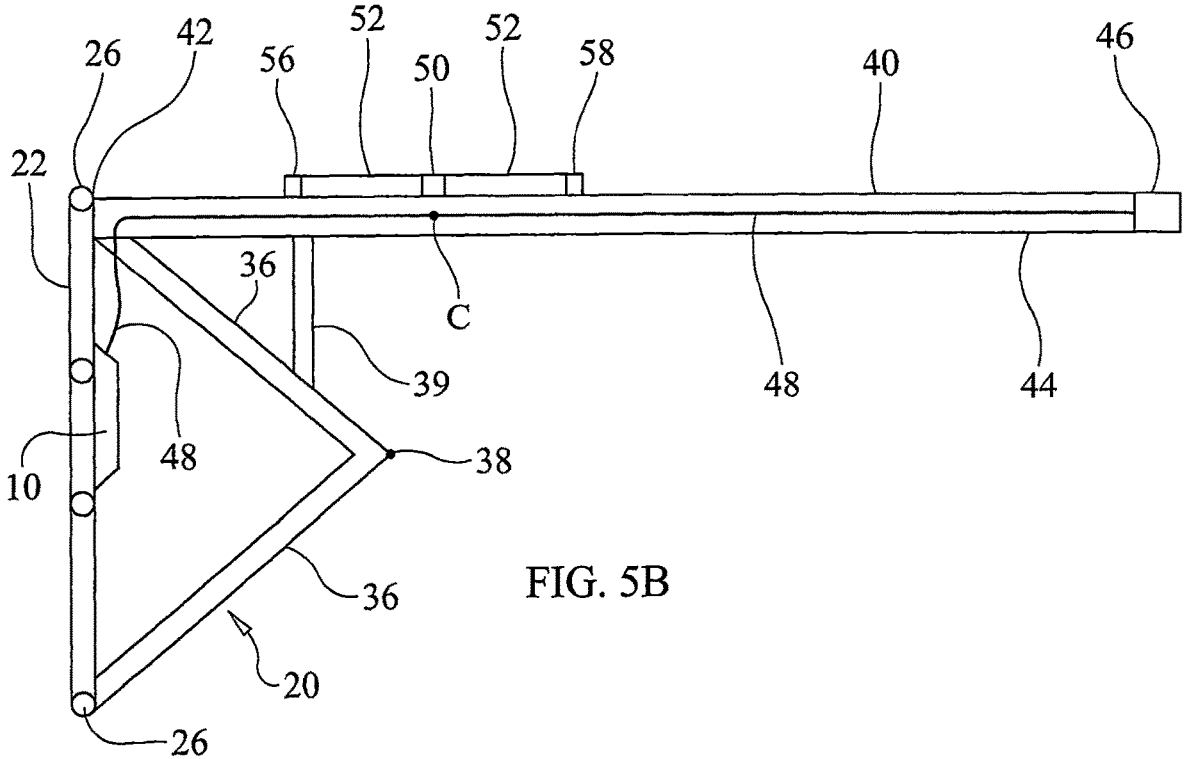

FIGS. 5A and 5B are top and elevation views, respectively, an exemplary embodiment of additional components of the EOD apparatus that are connected to the flexible web docking ring 20 of FIGS. 4A and 4B. A longitudinal member 40 has one (longitudinal) end 42 that is fixed to and extends perpendicular from one of the eight sides that form the octagonal base 22. In an exemplary embodiment, the longitudinal member 40 may be about six feet long. The longitudinal member 40 is lightweight and may be made of, for example, plastic. The longitudinal member 40 may be, for example, a hollow tube with a square cross-section, although other cross-sections may be used and the longitudinal member need not be hollow.

As best seen in FIG. 5B, the longitudinal member 40 may be further supported by a stabilizing member 39 having one (stabilizing) end fixed to the longitudinal member 40 and a second (stabilizing) end fixed to one of the four equally-spaced apart angled members 36 near the intersection 38 of the four equally spaced-apart angled members. The second stabilizing end of the stabilizing member 39 may be fixed to a point on one of the members 36 other than the fixation point shown in the FIGS. or may be fixed to the intersection 38.

The opposite end, that is, the second (longitudinal) end, 44 of the longitudinal member 40 has a fireset 46 fixed thereon. Basically, the fireset 46 is an electronic RF receiver that receives a wireless signal and wired to a blasting cap. When the RF signal is sent from the transmitter, the fireset releases energy to initiate the blasting cap which will initiate the explosive charge. More specifically, the fireset 46 is connected to the EOD neutralization tool or tools 14 on the tool holder ring 10 with an initiating signal transmitter 48, for example, detonator cord or shock tube. From a functional standpoint, the fireset 46 receives a fire signal from the unmanned vehicle or human operator to initiate the EOD neutralization tool 14 on the tool ring 10. The fireset 46 may be activated in several ways. For example, if the target 100 is underwater, the fireset 46 may be activated by an acoustic signal and if the target 100 is above water, the fireset 46 may be activated by an electromagnetic signal, such as a radio signal. Once the fireset 46 is activated, the initiating signal transmitter 48 will initiate the EOD neutralization tool 14 on the tool holder ring 10. One function of the longitudinal member 40 is to act as a spacer between the tool holder ring 10 and an unmanned delivery vehicle (discussed below). The space needed is greater if the unmanned vehicle is a UAV than if the unmanned vehicle is a UUV because of the rotors that extend from a UAV.

A cross arm 50 best seen in FIG. 5A may be fixed perpendicular to the longitudinal member 40 at a point on the longitudinal member 40 that is the center of gravity C of the combined tool holder ring 10, flexible web docking ring 20, longitudinal member 40 and fireset 46. The fireset 46 provides a counterbalance to the tool holder ring 10 and flexible web docking ring 20 at the opposite end of the longitudinal member 40 from the fireset. The cross arm 50 may be of the same material and cross-section as the longitudinal member 40 or a different material and cross-section.

As best seen in FIG. 5A, a second elastic cord 52 is fixed to a first (cross) end 54 of the cross arm 50 and extends to and is fixed at first and second fixation points 56, 58 located on the longitudinal member 40 on opposite sides of the cross arm. The second elastic cord 52 extends from the first and second fixation points 56, 58, respectively, on the longitudinal member 40 to a second (cross) end 60 of the cross arm 50 and is fixed to the second end of the cross arm such that the second elastic cord forms a four-sided polygon shape, similar to a diamond shape.

Figure 6:
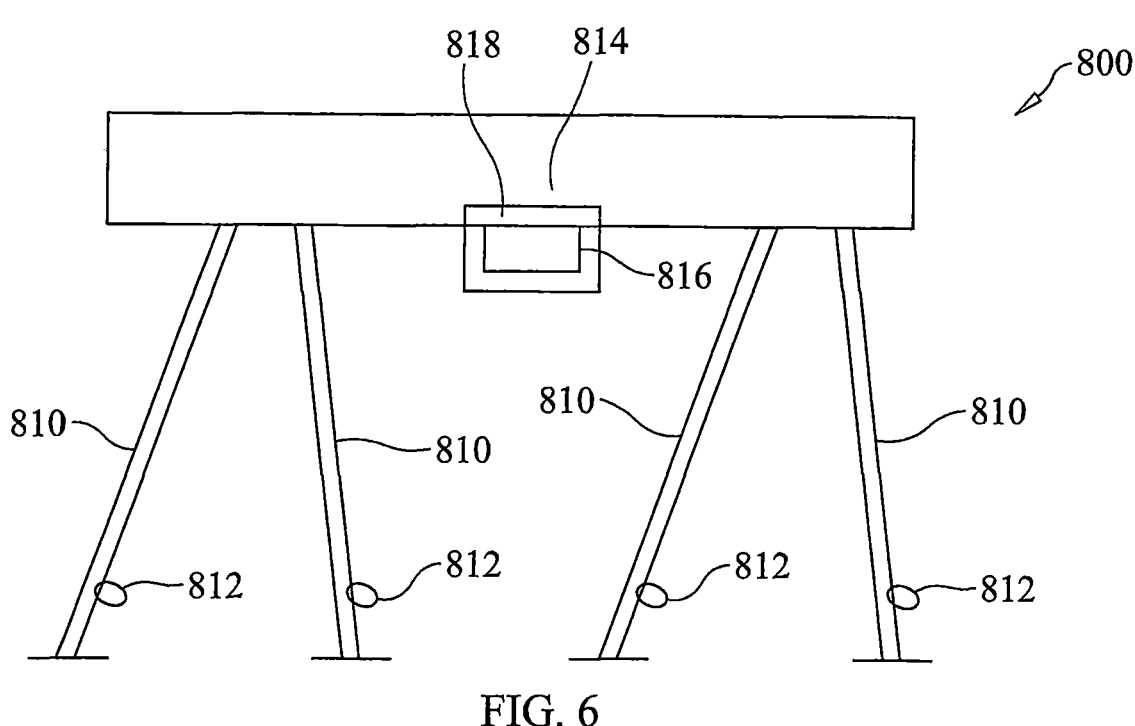
FIG. 6 is a schematic of an embodiment of an unmanned aerial vehicle.
Figure 7:
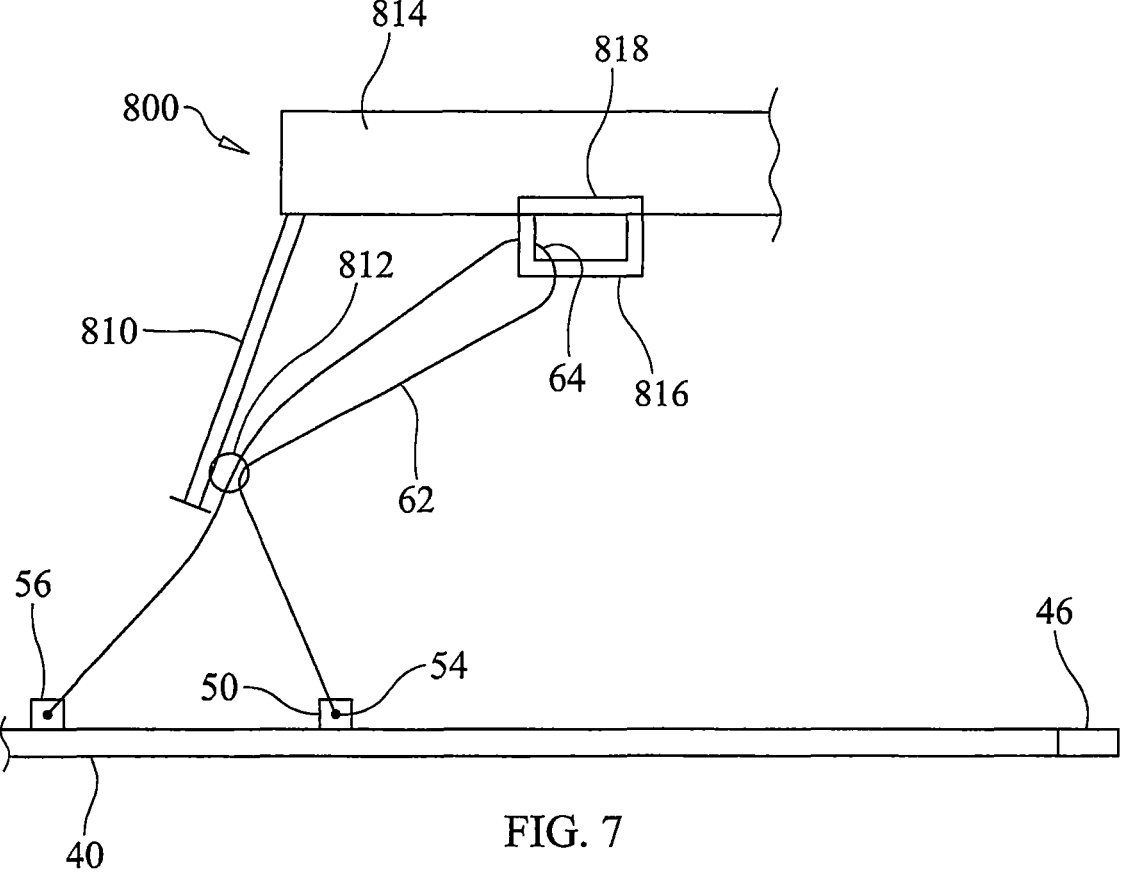
FIG. 7 is a schematic illustrating the formation of a portion of a tensegrity structure between an unmanned aerial vehicle and an EOD apparatus.

Referring to FIG. 7, a closed-loop low-stretch line 62 is connected to the longitudinal member 40, cross arm 50 and an unmanned aerial vehicle 800 (or unmanned underwater vehicle) in a manner to form a tensegrity structure, as described further below with reference to FIGS. 6 and 7. The closed-loop low-stretch line 62 may be made of, for example, ultra-high molecular weight polyethylene fiber (for example, DYNEEMA® or SPECTRA®) or aramid fiber (for example, KEVLAR®). For purposes of illustration, the tensegrity structure will be discussed with reference to an unmanned aerial vehicle 800, hereinafter "UAV".

FIG. 6 is a schematic of an unmanned aerial vehicle 800 for use with the EOD apparatus. FIG. 7 is a schematic illustrating the formation of a portion of the tensegrity structure between the UAV 800 and the EOD apparatus. The UAV 800 has four equally spaced-apart legs 810 that depend downwardly from the body 814 of the UAV. A circular eyelet 812 is fixed proximate to the bottom of each respective leg 810. A U-bend or open loop 64 of the line 62 passes through each circular eyelet 812. The body 814 of the UAV 800 includes a conventional drop kit 818 with a pin 816 over which the U-bends or open loops 64 of the line 62 may be draped. Then, when all four U-bends 64 of the line 62 are draped over the pin 816, the pin 816 may be locked in a closed position to prevent the U-bends 64 from slipping off the pin 816.

An exemplary method of threading the line 62 includes the following steps. First, the line 62 is fixed to the first end 54 of the cross arm 50, then to the first fixation point 56 on the longitudinal member 40. An open loop or U-bend 64 is formed in the line 62 and fed through the circular eyelet 812 and then looped around the open pin 816. The length of the segment of line 62 between points 54 and 56 must be sufficient to reach and loop around the pin 816 while maintaining tension in the line 62. Three additional segments or loops of line 62 are similarly formed and looped around the pin 816: a second segment is formed between the fixation point 56 and the second end 60 of the cross arm 50; a third segment is formed between the second end 60 of the cross arm 50 and the fixation point 58 on the longitudinal member 40; and a fourth segment is formed between the fixation point 58 and the first end 54 of the cross arm. In each of the three additional segments of line 62, a loop or U-bend 64 is formed in the line 62, fed through an adjacent one of the circular eyelets 812, and then looped around the pin 816. Only one U-bend 64 is fed through each circular eyelet 812. After feeding the U-bend 64 of each of the four segments through a respective circular eyelet 812 and sliding the four U-bends over the pin 816, the pin is closed so that each of the four segments of the line 62 form a closed loop that is under tension. The arrangement of the closed-loop line 62 and the UAV 800 forms a tensegrity structure that allows the UAV to control the EOD apparatus during movement.

A launch stand (not shown) the supports bottoms of each of the legs 810 allows the UAV 800 to be positioned on land with the entire apparatus hanging under the UAV 800, for initial set-up and subsequent launch of the UAV. For underwater work, the UAV 800 is replaced with a UUV (not shown). The UUV may include four downwardly depending legs with circular eyelets, drop kit, and a pin, that are similar to the corresponding structure described in connection with the UAV 800.

In one exemplary embodiment, a method of operation may include attaching the EOD neutralization tool 14 to the tool holder ring 10. The tool holder ring 10 is attached to the octagonal base 22 with the closed-loop elastic cord 28 arranged in a 4-star pattern. The longitudinal member 40 is fixed to one side 24 of the octagonal base 22 and fixed to the stabilizing member 39. The second elastic cord 52 connects the ends 54, 60 of the cross arm 50 with the fixation points 56, 58 on the longitudinal member 40. The low-stretch line 62 connects the UAV 800 to the longitudinal member 40 and cross arm 50, as discussed above.

As the UAV 800 and the EOD apparatus approach the target 100, the tool holder ring 10 is positioned on the target while the octagonal base 22 is pushed onto the ferrous or non-ferrous structure/surface 200 behind the target (steel plate, etc.). In an exemplary embodiment, the magnets 26 on the octagonal base 22 secure the octagonal base 22 and tool holder ring 10 in position on the ferrous structure/surface 200 and the target 100. A remote command is sent to the drop kit 818 to release the pin 816 thereby allowing the four loops of the line 62 to slide off the pin. Then, each of the four loops of the line 62 slides through a respective circular eyelet 812, thereby completely releasing the UAV 800 from the longitudinal member 40 and the cross arm 50 and allowing the UAV 800 to depart from the threat 100. Then, a remote command to the fireset 46 activates the EOD neutralization tool 14 to neutralize the threat 100.

Finally, any numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An explosive ordnance disposal apparatus for neutralizing a target attached to a surface, comprising:

a tool holder ring being configured for holding an explosive ordnance disposal neutralization tool, the tool holder ring includes a shape to conform to at least a portion of the target and having four loops equally spaced around the tool holder ring;

a flexible web docking ring, wherein the flexible web docking ring includes an octagonal base large enough to surround the tool holder ring and the target; a plurality of magnets attached to and spaced apart on one face of the octagonal base and configured to attach the octagonal base to the surface surrounding the target;

an elastic cord in the form of a 4 point star pattern that centers the tool holder ring to the octagonal base wherein four outer vertices of the 4 point star pattern elastic cord are fixed to respective ones of four equally spaced-apart points on the octagonal base and four inner vertices of the 4 point star pattern elastic cord are slidably connected to the tool holder ring by passing the 4 point star pattern elastic cord through respective ones of the four loops equally spaced around the tool holder ring; and four angled members having first ends equally spaced-apart and fixed to the octagonal base, the four members extending upwardly away from the octagonal base at an angle of about 45 degrees and ending in second ends that are joined together at a central longitudinal axis of the octagonal base;

a longitudinal member including a first longitudinal end being fixed to and extending perpendicular from one of eight sides of the octagonal base;

a fireset being fixed to a second longitudinal end of the longitudinal member, the fireset is connected to the explosive ordnance disposal neutralization tool via an initiating signal transmitter;

a stabilizing member including one stabilizing end being fixed to the longitudinal member and a second stabilizing end being fixed near the second end of one of the four equally-spaced apart angled members of the flexible docking ring;

a cross arm being fixed perpendicular to the longitudinal member at a point on the longitudinal member that is the center of gravity of the combined tool holder, flexible web docking ring, and longitudinal member;

a second elastic cord being fixed to a first cross end of the cross arm and extending to and fixed to first and second fixation points located on the longitudinal member on opposite sides of the cross arm, the second elastic cord extends from the first and second fixation points on the longitudinal member to a second end of the cross arm and fixed to the second cross end of the cross arm such that the second elastic cord forms a four-sided polygonal shape; and a low-stretch line being connected with the longitudinal member, the cross arm and an unmanned vehicle to form a tensegrity structure, wherein the low-stretch line is fixed to the first cross end and the second cross end of the cross arm and the first and second fixation points located on the longitudinal member to define four loops of the low-stretch line, wherein each loop of the low-stretch line is looped over a pin in a drop kit of the unmanned vehicle so that the explosive ordnance disposal apparatus travels with the unmanned vehicle, and wherein the apparatus is configured so that when the pin is opened, the four loops of the low-stretch line are released from the unmanned vehicle thereby separating the explosive ordnance disposal apparatus from the unmanned vehicle.

2. The apparatus of claim 1, further comprising an unmanned vehicle.

3. The apparatus of claim 2, wherein the unmanned vehicle is one of an aerial vehicle and an underwater vehicle.

4. The apparatus of claim 1, further comprising an unmanned vehicle, wherein the unmanned vehicle includes four downwardly depending legs with a circular eyelet disposed at a bottom portion of each downwardly depending leg.

5. The apparatus of claim 4, wherein each of the four loops of the low-stretch line are looped over the pin and pass through a respective circular eyelet.

6. The apparatus of claim 1, wherein the surface is a ferrous surface.

7. The apparatus of claim 1, wherein the surface is a non-ferrous surface.

8. An explosive ordnance disposal apparatus for neutralizing a target attached to a surface, comprising:

a tool holder ring for holding an explosive ordnance disposal neutralization tool, the tool holder ring includes a shape to conform to at least a portion of the target and includes four loops equally spaced around the tool holder ring;

a flexible web docking ring, the flexible web docking ring includes an octagonal base large enough to surround the tool holder ring and the target; a plurality of magnets attached to and spaced apart on one face of the octagonal base and configured to attach the octagonal base to the surface surrounding the target;

an elastic cord in the form of a 4 point star pattern that centers the tool holder ring to the octagonal base wherein four outer vertices of the 4 point star pattern elastic cord are fixed to respective ones of four equally spaced-apart points on the octagonal base and four inner vertices of the 4 point star pattern elastic cord are slidably connected to the tool holder ring by passing the 4 point star pattern elastic cord through respective ones of the four loops equally spaced around the tool holder ring; and four angled members having first ends equally spaced-apart and fixed to the octagonal base, the four members extending upwardly away from the octagonal base at an angle of about 45 degrees and ending in second ends that are joined together at a central longitudinal axis of the octagonal base;

a longitudinal member including a first longitudinal end being fixed to and extending perpendicular from one of eight sides of the octagonal base;

a fireset being fixed to a second longitudinal end of the longitudinal member, the fireset is connected to the explosive ordnance disposal neutralization tool via an initiating signal transmitter;

a cross arm being fixed perpendicular to the longitudinal member at a point on the longitudinal member that is the center of gravity of the combined tool holder, flexible web docking ring, and longitudinal member;

a second elastic cord being fixed to a first cross end of the cross arm and extending to and being fixed to first and second fixation points located on the longitudinal member on opposite sides of the cross arm, the second elastic cord extends from the first and second fixation points on the longitudinal member to a second cross end of the cross arm and fixed to the second cross end of the cross arm such that the second elastic cord forms a four-sided polygonal shape; and a low-stretch line being connected with the longitudinal member, the cross arm, and an unmanned vehicle for forming a tensegrity structure.

9. The explosive ordnance disposal apparatus of claim 8, wherein the low-stretch line is fixed to the first cross end and the second cross end of the cross arm and the first and second fixation points located on the longitudinal member to define four loops of the low-stretch line and further, wherein each loop of low-stretch line is looped over a pin in a drop kit of the unmanned vehicle so that the explosive ordnance disposal apparatus travels with the unmanned vehicle, and wherein the apparatus is configured so that when the pin is opened, the four loops of the low-stretch line are released from the unmanned vehicle thereby separating the explosive ordnance disposal apparatus from the unmanned vehicle.

10. The explosive ordnance disposal apparatus of claim 9, further comprising a stabilizing member including one stabilizing end being fixed to the longitudinal member and a second stabilizing end being fixed near the second end of one of the four equally-spaced apart angled members of the flexible docking ring.

11. The apparatus of claim 9, wherein the unmanned vehicle is one of an aerial vehicle and an underwater vehicle.

12. The apparatus of claim 9, wherein the unmanned vehicle includes four downwardly depending legs with a circular eyelet disposed at a bottom portion of each downwardly depending leg.

13. The apparatus of claim 9, wherein the unmanned vehicle includes four downwardly depending legs with a circular eyelet disposed at a bottom portion of each downwardly depending leg, and wherein each of the four loops of the low-stretch line that are looped over the pin-pass through a respective said circular eyelet.

14. The apparatus of claim 8, wherein the surface is a ferrous surface.

15. The apparatus of claim 8, wherein the surface is a non-ferrous surface.

* * * * *